United States Patent [19]
Jenny

[11] Patent Number: 5,369,466
[45] Date of Patent: Nov. 29, 1994

[54] EXPOSURE SYSTEM FOR PHOTOGRAPHIC COPYING MACHINES

[75] Inventor: Reinhard Jenny, Ennetbaden, Switzerland

[73] Assignee: Gretag Imaging AG, Regensdorf, Switzerland

[21] Appl. No.: 117,715

[22] Filed: Sep. 8, 1993

[30] Foreign Application Priority Data

Sep. 9, 1992 [EP] European Pat. Off. ........ 92810689.7

[51] Int. Cl.$^5$ ............................................. G03B 27/54
[52] U.S. Cl. ................................................. 355/67
[58] Field of Search ................... 355/67, 237, 229; 359/385; 362/284, 285

[56] References Cited

U.S. PATENT DOCUMENTS

| | | | |
|---|---|---|---|
| 4,194,834 | 3/1980 | Guillaume | 355/67 |
| 4,229,097 | 10/1980 | Vulmiere et al. | 355/35 |
| 4,371,258 | 2/1983 | Mast | 355/37 |

FOREIGN PATENT DOCUMENTS

| | | |
|---|---|---|
| 0000450 | 1/1979 | European Pat. Off. |
| 0025849 | 4/1981 | European Pat. Off. |
| 0046732 | 3/1982 | European Pat. Off. |
| 3226408 | 1/1984 | Germany |
| 3230623 | 2/1984 | Germany |
| 3629711 | 5/1987 | Germany |
| 119317 | 2/1948 | Netherlands |

OTHER PUBLICATIONS

European Search Report EP 92810689, May 11, 1993.

*Primary Examiner*—A. T. Grimley
*Assistant Examiner*—Nestor R. Ramirez
*Attorney, Agent, or Firm*—Burns, Doane, Swecker & Mathis

[57] ABSTRACT

The exposure system includes a bulb housing, an ellipsoid reflector, and a light source located near a first focal point of the ellipsoid reflector. With respect to the light beam path, an optical unit is located in front of the plane of an original to be copied in order to produce a desired distribution of the exposure intensity onto the original. Imaging optics are located in a light beam path behind the plane of the original, for reproducing the original onto photographic copying material. Furthermore, the exposure system includes a device for dyeing the light that illuminates the original. The device for dyeing is located in the light beam path in front of the optical unit and includes color filters which can be moved into and out of the light beam path on a plane that is perpendicular to the optical axis. The light source can be moved along the optical axis. The device for dyeing the light beam is located between the light source and the optical unit such that a light beam that penetrates a point of an edge of the original and intersects the optical axis at the location of an entry pupil of the imaging optics, also intersects the optical axis at the location of the device for dyeing.

5 Claims, 5 Drawing Sheets

_Fig. 4a_

_Fig. 4b_

EXPOSURE SYSTEM FOR PHOTOGRAPHIC COPYING MACHINES

BACKGROUND OF THE INVENTION

The present invention relates generally to an exposure system for photographic copying machines, such as copying machines used for reproducing original images of a film strip of negatives onto a photographic copying material (e.g., photographic paper).

In photographic copying machines commonly used today, copies are usually made from originals in such a way that the originals being copied, for example in the form of picture frames on a film strip of negatives, are measured and then exposed with the required mount of copying light onto photographic copying material, such as photographic paper. During the exposure, the image field being exposed onto the photographic paper is reproduced onto the paper by means of an exposure system and imaging optics. In order to obtain a reproduction that is as similar to the original as possible, the light coming from a light source, for example from a bulb, is "dyed." The light is dyed by means of optical color filters, which are inserted in the path of the light beams. The dyed light is then guided to the original (e.g., to a negative), which is supposed to be exposed onto the photographic paper, and illuminates the original. Imaging optics are also located in the path of light for the original, whereby the exposed original is then reproduced onto the photographic paper.

An exposure system of this kind is described, for example, in DE 32 26 408. A bulb housing with a light source and an ellipsoid reflector for better use of the light emanating from the light source is provided in the exposure system described in the aforementioned patent, whereby the bulb coil of the light source is positioned at the first focal point of the ellipsoid reflector. The light emanating from the bulb housing is dyed as it proceeds along its course by means of a device, which has adjustable color filters in the beam path and a diaphragm with a diaphragm aperture. This device is positioned at a specific distance in front of or behind the second focal point of the ellipsoid reflector in such a way that the interior region of the diaphragm aperture is located in the shadow of the light source. The distance is a function of the diameter of the diaphragm aperture, of the small semi-axis of the ellipse that forms the basis for the ellipsoid reflector, and of the focal length of this ellipse.

The color filters of this device in the exposure system described above have three batteries of filters. Each battery of filters, when swung into place, covers roughly a third of the cross section of the cone of light entering the diaphragm aperture, whereby the battery of filters is swung into the light path by mechanical means.

But such batteries of filters have certain disadvantages. For example, when such filters are swung into place mechanically, it cannot be assured that the individual glass filters of the battery of filters will penetrate to precisely the same depth in the cone of light, i.e., that they cover at each time a precisely identical mount of the cross section of the cone of light passing through the diaphragm aperture. This is more or less unavoidable when the glass filters are swung into place mechanically. As a result, this mechanically-related uneven permeation of the glass filters can lead to inhomogeneities of the intensity distribution on the negative or to an intensity distribution that deviates from the desired intensity distribution. Furthermore, when the glass filters are arranged in the light beam path, it is also possible for the edges of the filters or their shapes to produce more or less contrast-rich structures in their intensity distribution. The result of this intensity distribution that deviates from the desired intensity distribution on the negative is, in turn, a concomitant poorer color reproduction of the contents of the negative onto the photographic paper.

This is even more so the case since the transmission characteristics of the optical glass filters are never exactly identical, as a result of manufacturing idiosyncracies, for the given color in the three batteries of filters, so that when the glass filters are placed in the path of the light beam, then certain parts of the cone of light penetrating the diaphragm aperture are dyed to a greater or lesser extent. Furthermore, the transmission characteristics of such glass filters are not even (i.e., homogeneous) across the entire surface of the glass filters and also display a certain structure (so-called density structure). This structure of the filters can be present on the original (negative) and is, as a result, also reproduced by the imaging optics onto the copying material (photographic paper). The deeper the given glass filter is moved into the path of the light beam, the more the shape and irregularities can become noticeable on the transmission characteristics of the glass filter. The result can be an inhomogeneous intensity distribution or an intensity distribution that deviates from the desired intensity distribution of the light of the given color onto the negative as well as a reproduction of the structure of the glass filter. In this way, the true to color reproduction of the content of the negative onto the photographic paper can be influenced more or less negatively because the imaging optics only reproduce the negative onto the photographic paper.

SUMMARY OF THE INVENTION

Therefore, the present invention is directed to creating an imaging system which makes it possible in a simple way to reproduce an original whose colors are as true as possible to the original. In particular, a homogeneous and desired intensity distribution onto the negative is to be achieved and the reproduction of the structures of the glass filters is to be prevented. In addition, in a simple way it should be possible to change the intensity with which the original is exposed without, however, significant detriment to the homogeneity and the desired intensity distribution.

In accordance with an exemplary embodiment of the invention, this task is solved by an exposure system in which the light source can be moved along the optical axis and in which the mechanism for dyeing the light beam is positioned in the beam of light between the light source and the optical unit in such a way that a beam, which passes through a point on the edge of the original and intersects the optical axis at a location of an entry pupil of the imaging optics, also intersects the optical axis at the location of the dyeing device. As a result of this particular configuration, one can avoid reproducing structures of the glass filters, whereby it is also possible to change the exposure intensity (by moving the glass filters deeper into the beam of light) without significant detriment to the homogeneity of the intensity distribution. Therefore, it is possible in this way to vary the intensity in an essentially homogeneous way even if the glass filters are not positioned at even depth in the beam of light, e.g., for mechanical reasons. In extreme cases, it is even possible to insert a glass filter into the cone of light in a completely asymmetrical way and to vary the exposure intensity without significant detriment to the homogeneity of the intensity distribution.

In another embodiment, the optical unit contains a field lens for producing a desired intensity distribution as well as a light shaft for the light beam emanating from the field lens; this field lens is positioned near the second focal point of the ellipsoid reflector. The light shaft is located at a certain distance from the field lens in such a way that the lens images onto the diffusing plate an optical flat plane that is perpendicular to the optical axis and penetrates the apex of the ellipsoid reflector or is located between the apex and the first focal point.

In another embodiment or in a further development of the aforementioned embodiment of the exposure system, correction plates are located between the device for dyeing the light and the optical unit in order to generate the desired intensity distribution. These correction plates result in a more even distribution of color intensity on the original should asymmetrically appearing color densities have to be corrected (slanted beams are dyed to different degrees).

In a further development of the exposure system, a beam splitter is placed in front of the optical unit and the light shaft; it guides a portion of the light from the light beam for a light measurement. Such measurements, for example, can be used for measuring the individual color portions in the cone of light and, thereby, be used for regulating the position of the glass filters by placing the glass filters higher or lower in the cone of light as a function of the measurement results.

In a further development of the exposure system, a heat protection filter and a comb filter are positioned in front of the device for dyeing the light. The purpose of the heat protection filter is readily evident from its name alone. The comb filter, whose purpose cannot be derived directly from its name, is transparent only for light in the spectral ranges for which the copying material is sensitive and it suppresses or heavily subdues the other spectral segments of the light coming from the bulb housing.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein:

FIG. 1b shows an enlarged section of the exposure system displayed in FIG. 1a;

FIG. 4b shows a bird's eye view of the embodiment of the exposure system displayed in FIG. 4a.

DETAILED DESCRIPTION OF THE PREFERRED EMBODIMENTS

Figure 1A:
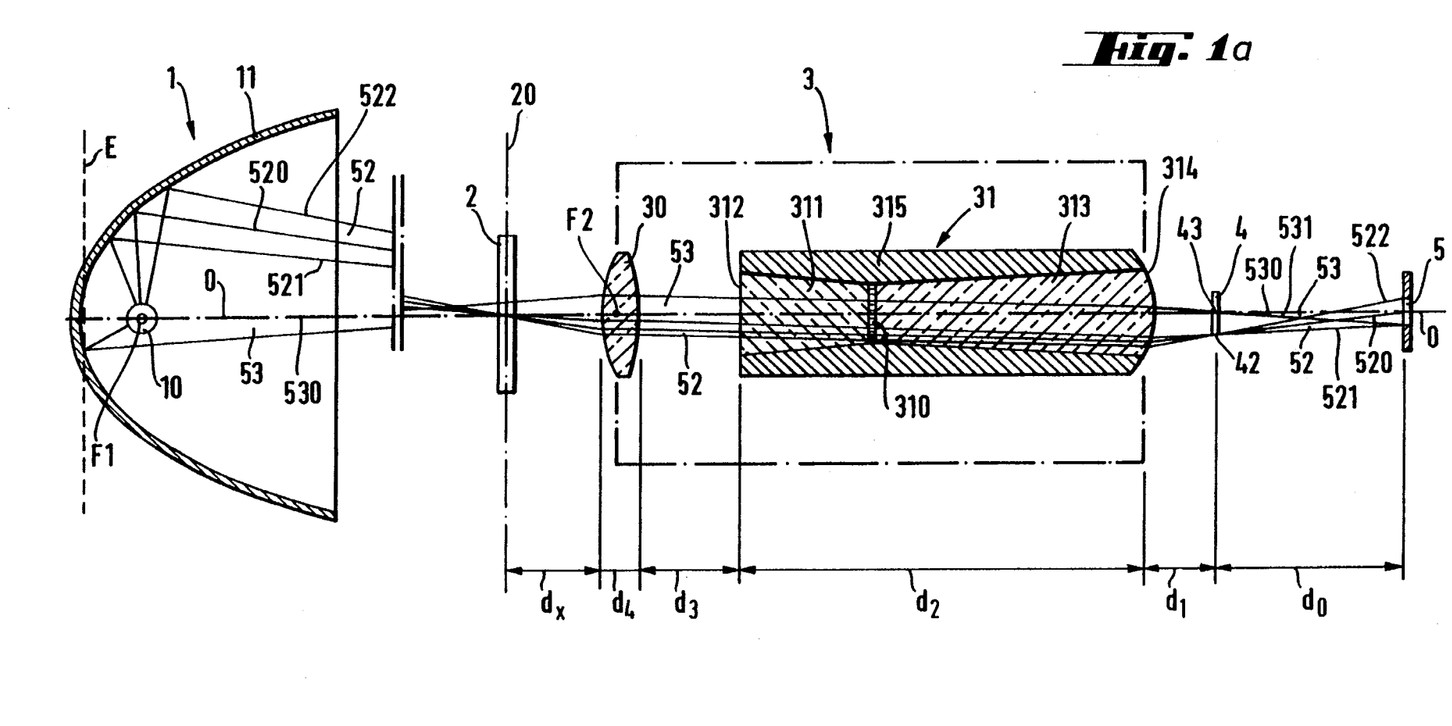
FIG. 1a shows an exemplary embodiment of an exposure system in accordance with the invention.

An exemplary embodiment of an exposure system in accordance with the invention displayed in FIG. 1a essentially includes a housing, 1, with a light source, 10, and an ellipsoid reflector, 11. The light source, 10, is located near the first focal point, F1, of the ellipsoid reflector, 11, and can be moved along the optical axis, O, of the system. The light coming from the bulb housing illuminates an optical unit, 3, for generating a desired distribution of the exposure intensity on an original, 4. In the embodiment shown here, the optical unit, 3, consists of a field lens, 30, which is located near the second focal point, F2, of the ellipsoid reflector, 11, and which guides the light to a light shaft, 31, that belongs to the optical unit, 3, as well; a diffusing lens, 310, for diffusing the light entering the light shaft, 31, is provided in the shaft. The light shaft is positioned at a certain distance from the field lens, 30, so that the field lens, 30, images onto the diffusing plate, 310, an optical flat plane, E, that penetrates the apex of the ellipsoid reflector, 11. Behind the light shaft, 31, one can recognize the original, 4, which is illuminated by the light coming from the light shaft, 31. The original is reproduced onto photographic copying material (not illustrated) by means of imaging optics, which is represented by its entry pupil, 5, and which is positioned in the light beam path behind the original, 4.

Figure 2:
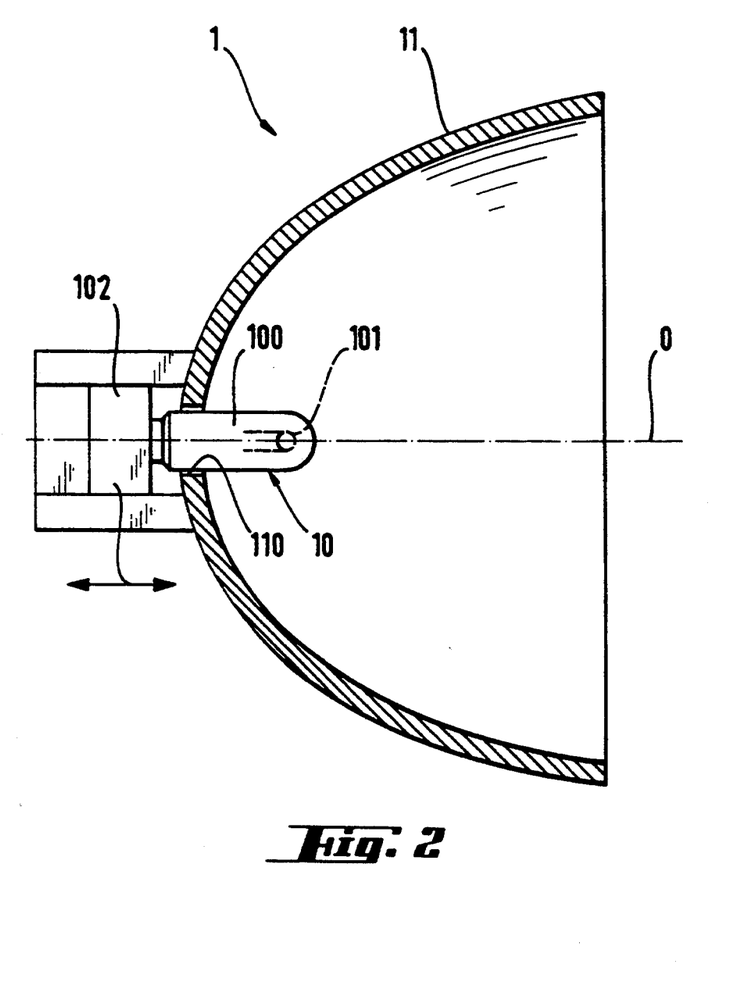
FIG. 2 shows an exemplary embodiment of a light source that can be moved along the optical axis.

FIG. 2 schematically illustrates one possibility for moving the light source, 10, along the optical axis, O, of the system. The light source, 10, that can be inserted through an opening, 110, into the interior of the ellipsoid reflector, 11, consists of a bulb coil, 101, surrounded by a glass body, 100. The glass body, 100, penetrates the opening, 110, and is connected to an adjustable base, 102, that is outside of the reflector, 11; by means of the adjustable base, the light source can be moved from the outside along the optical axis, O, of the system. Normally, the bulb coil, 101, is located more or less precisely at the first focal point, F1, of the ellipsoid reflector, 11, and can only be moved for a relatively short distance in front of or behind the focal point, F1. The mobility of the light source, 10, primarily serves to vary the intensity distribution at the plane where the original, 4, is located in order to achieve with the help of the optical unit, 3, a desired intensity distribution on the original, 4, and then on the copying material.

The light shaft, 31, can be formed from two truncated cone-like glass bodies, 311 and 313, that can be connected and between which is located the volume diffusing plate, 310, which, for example, can be designed as an acrylic plate. Optionally, the entry surface, 312, of the glass body, 311, and, thereby, of the light shaft, 31, can also be designed as a diffusing plate for scattering the light entering the light shaft, 31, but this is not displayed in the illustrations for reasons of clarity. The exit surface, 314, of the glass body, 313, and, thereby, of the light shaft, 31, can be designed in a convex shape, as indicated in FIG. 1a. The glass bodies, 311 and 313, can be positioned in a cylinder, 315, which envelopes the glass bodies and which, for example, can consist of aluminum.

Figure 3:
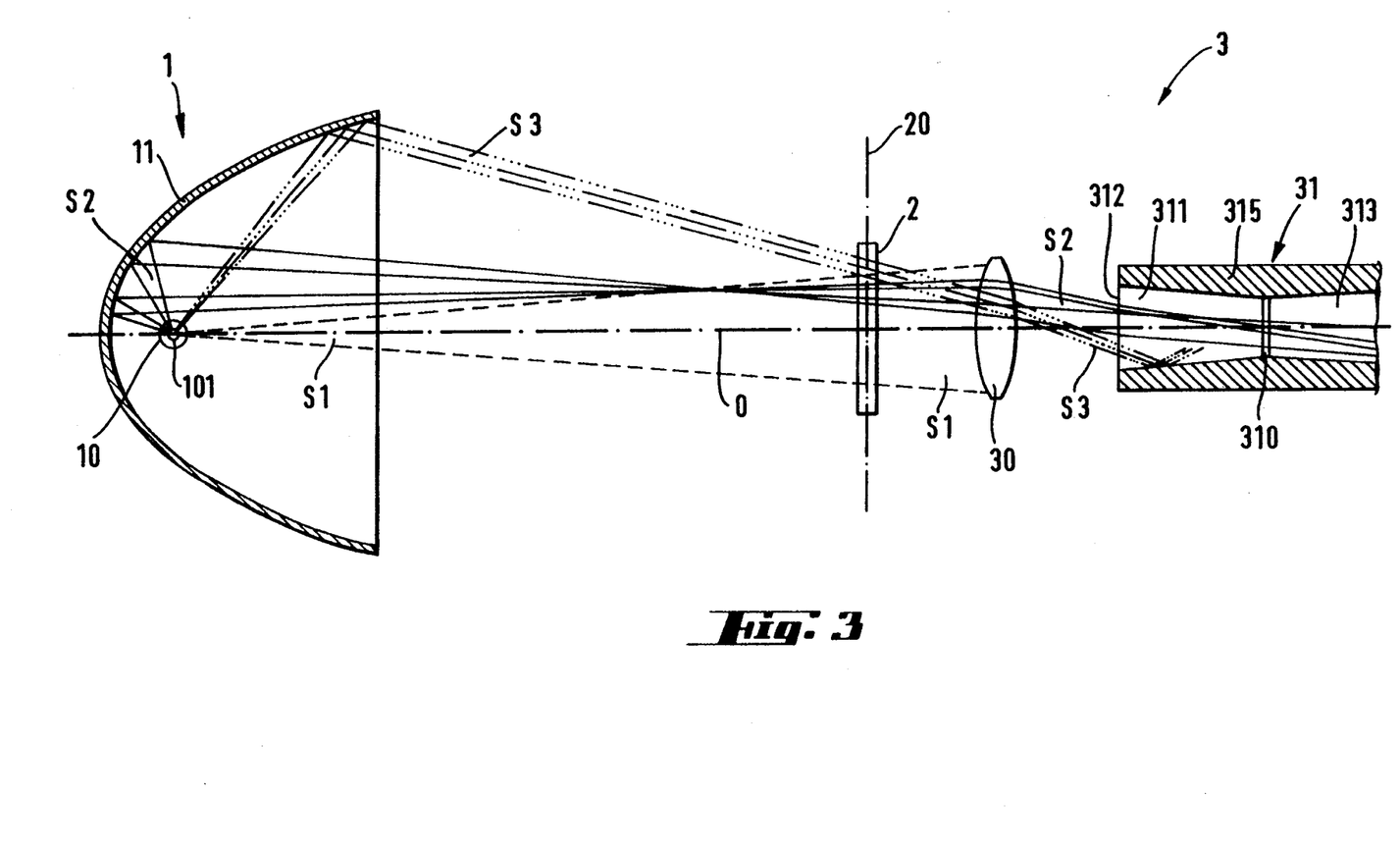
FIG. 3 shows another enlarged section of the exposure system in FIG. 1 with the various beam groups generated by the light source.

Another section of the exposure system displayed in FIG. 1a is enlarged in FIG. 3. From this cross section, it is especially easy to recognize the three important light beam groups, which contribute to an exposure of the original, 4. They consist of the light beam group S1, which radiates from the bulb coil, 101, of the light source, 10, directly toward the field lens, 30. Furthermore, one can recognize a second light beam group, S2, which initially radiates away from the field lens, 30, but then is reflected at the ellipsoid reflector, 11, and is radiated in the direction of the field lens, 30. Finally, one can recognize a third light beam group, S3, with beams that are reflected at the external zones of the ellipsoid reflector, 11, and are radiated in the direction of the field lens, 30.

From the perspective of FIG. 1a, it is readily evident for the two light beam groups S1 and S2 that light from these groups of light beams, because of the angle, enter the light shaft, 31, below the beams of these light beam groups and exit the shaft once again, evenly contributing to the reproduction of the original, 4, and making it possible to enter the entry pupil, 5, of the imaging optics. However, this is not directly evident for beams from light beam group S3. The beams from light beam groups S3 are totally reflected in the light shaft, 31, and once they exit the light shaft, 31, they have such a large angle with respect to the optical axis that they essentially cannot enter the entry pupil, 5, of the imaging optics. A not insignificant number of originals being copied (such as negative picture frames) have scratches, which are normally reproduced onto the paper when the original is reproduced—something customers dislike immensely. Such scratches appear even more so on the paper if they divert imaging beams emanating from the site of the scratches to the object because they then cannot enter the entry pupil, 5. In this way, the contrast of the scratches to the remaining picture content is even greater. If the beams of light beam group S3, which normally do not enter the entry pupil, 5, are diverted into the entry pupil, 5, by scratches (or other imperfections in the original), then they can contribute to a reduction in the contrast of the scratches to the remainder of the picture content.

As mentioned above, with the aid of the exposure system presented by the invention, an imaging system is created in a simple way that enables a reproduction of an original that is as true to color as possible and that makes it possible to achieve a homogeneous or desired intensity distribution on the negative and makes it possible to avoid the reproduction of structures of the glass filters or of their shadows. For this purpose, the dying device, 2, is supposed to be positioned at a very precise location in the light beam path. This location depends upon the individual components of the exposure system and can be calculated in a "recursive" way, which is explained below using FIG. 1b as an example. For easier comprehension, some introductory comments are in order.

One can recognize in FIG. 1a a cone of light beams, 52, emanating from the entry pupil, 5, of the imaging optics; the cone is represented by two light beams, 521 and 522, which illuminate the rim of the entry pupil, 5; the cone is also represented by a beam, 520, which intersects the optical axis, O, of the system at the location of the entry pupil, 5. This cone of light beams, 52, corresponds to the cone of light beams that emanates from a point on the rim, 42, onto the original, 4, and completely enters the entry pupil, 5, of the imaging optics, thereby contributing to the reproduction of the original, 4, or of the point on the edge, 42, of the original.

In FIG. 1a, one can also recognize a cone of light beams 53, which emanates from an axial point, 43, on the original, 4, and completely enters the pupil, 5, of the imaging optics, contributing thereby to the reproduction of the original, 4, or of an axial point, 43, of the original. For reasons of symmetry and clarity, only the axial light beam, 530, and an outer beam, 531, are indicated.

If one first follows the light beam cone, 52, which penetrates the point on the edge, 42, of the original, 4, then one can see that it intersects the beam, 520, which intersects the optical axis, O, at the location of the entry pupil, 5, and intersects optical axis O at optical flat plane 20, which is perpendicular to the optical axis. The outer beams, 521 and 522, however, are above and below the optical axis, O, at the location of the dyeing device, 2. If one follows the light beam cone, 53, then one can see that the axial beam, 530, of course runs along the optical axis, O, at the location of plane 20, and light beam 531 is above the optical axis. The other outer beam would have a course that is symmetrical to this.

Expressed in other words, this means that the cone of light, 52, which penetrates the point on the edge, 42, of the original, at the location of plane 20 and the cone of light, 53, which penetrates the axial point, 43, at the location of plane 20 have the greatest common cross sectional area between the light source and the optical unit, 3, and the field lens, 30. The dyeing device, 2, is located at this optical flat plane 20.

The location of plane 20, where the dyeing device is positioned, can be calculated recursively, as was indicated above. The distance, $d_0$, between the entry pupil, 5, and the plane of the original, 4; the distance, $d_1$, between the original, 4, and the exit surface of the light shaft, 31; the length, $d_2$, of the light shaft, 31; the distance, $d_3$, between the entry surface, 312, of the light shaft, 31, and the field lens, 30; as well as the thickness, $d_4$, of the field lens, 30, are given. These distances depend upon the specific data of the individual components, including the desired enlargement when reproducing the original, 4, etc.

What is being sought is the distance, $d_x$, of the aforementioned plane, 20, from the surface of the field lens, 30, facing the light source, 10, at which a light beam, 520, intersecting the optical axis, O, at the location of the entry pupil, 5, intersects the optical axis, O, between the light source, 10, and the field lens, 30. The dyeing device, 2, is to be positioned at this location. By positioning the dyeing device, 2, at this location it is possible to avoid the reproduction of structures and shapes (shadows) of the glass filters, whereby it is also possible to change the exposure intensity (by moving the glass filters deeper into the light beam path) without significant detriment to the homogeneity of the intensity distribution. In this way, it is possible, in particular, to vary the intensity in an essentially homogeneous way if the glass filters are not placed at precisely the same depth in the light beam path or in the cone of light, e.g., for mechanical reasons. In extreme cases, it is even possible to place a glass filter in fully asymmetrical fashion into the cone of light and to vary the exposure intensity without significant detriment to the homogeneity of the intensity distribution.

The location of plane 20 can be calculated in the following fashion, whereby $y_i$ represents the distance of the beam, 520, from the optical axis, O, to the designated points. These designated points are explained in more detail below. The light beam angle, $a_{i+1}$, which includes the light beam, 520, in the $i+1$ medium after the $i_{th}$ interface between two media with different diffraction indices, $n_i$ and $n_{i+1}$, with the optical axis, O, is calculated on the basis of the following equation:

$$n_{i+1}\alpha_{i+1} = n_i\alpha_i + y_i(n_{i+1}-n)/r_i \quad (1)$$

and the distance, $Y_{i+1}$, at the $(i+1)^{th}$ interface is calculated on the basis of the equation:

$$y_{i+1} = y_i - d_i\alpha_{i+1} \quad (2)$$

With the help of an example, such a calculation will be done below for light beam 520, which intersects the optical axis, O, of the system at the location of the entry pupil, 5, and penetrates a point on the edge, 42, of the original, 4. Beginning at the entry pupil, 5, for the imaging optics, first the initial light beam angle, $\alpha_0$, has to be determined. The distance of the point on the edge of the original from the optical axis, O, is $d_0$ and the distance of the imaging optics or of its entry pupil, 5, from the original, 4, is $x_0$. A marginal condition for the light beam angle, $\alpha_0$, is $$\alpha_0 = \arctan(y_0 d_0) \text{ is approximately } y_0/d_0 \text{ for small angles, } \alpha_0 \quad (3)$$

Figure 1B:
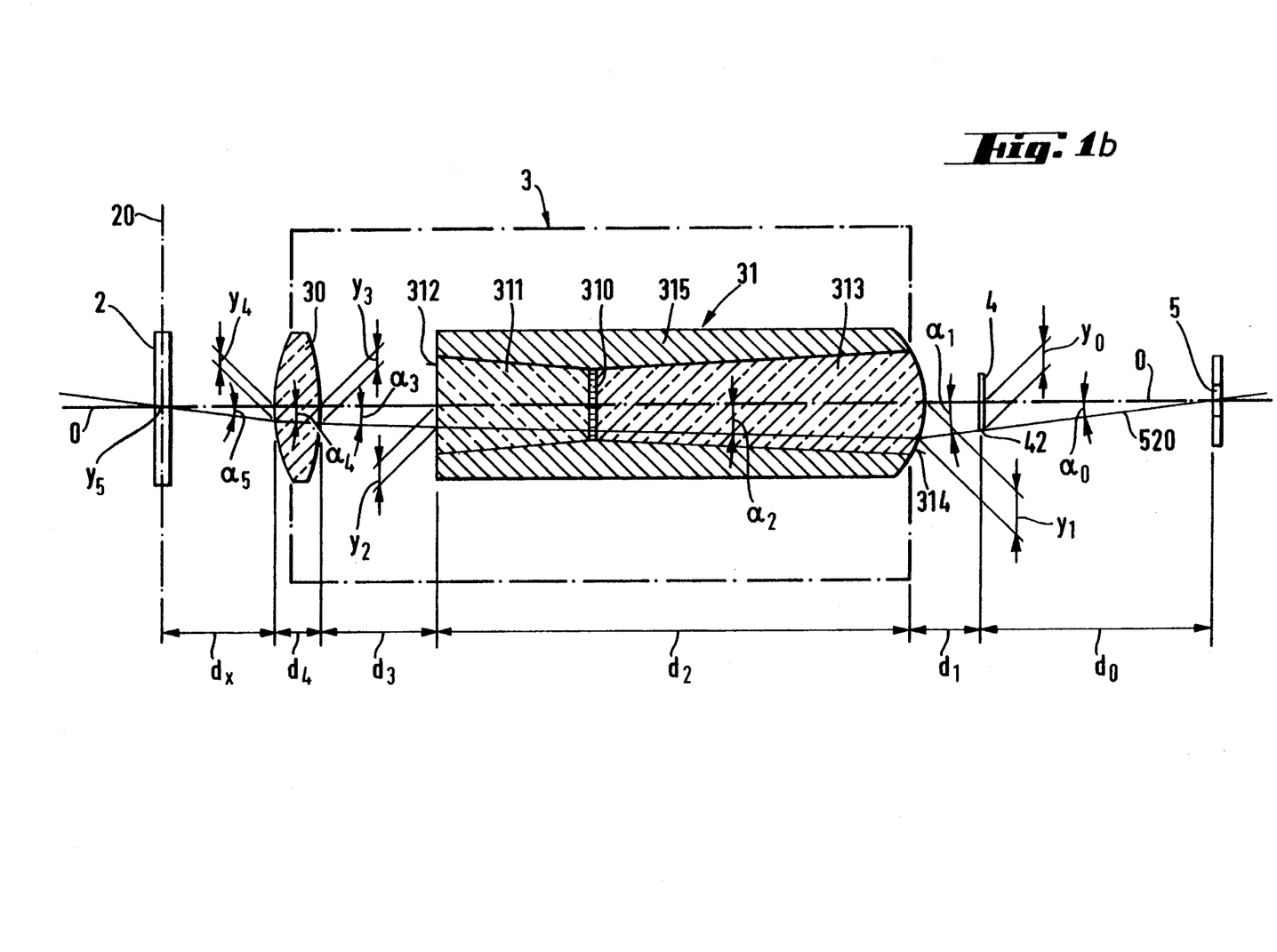

The angle, $\alpha_1$, of the light beam, 520, behind the original, 4, is identical to the angle, $\alpha_0$. As a result, the distance, $y_1$, can be calculated as follows at the location of the exit surface of the light shaft, 31, which is a certain distance, $d_1$, from the plane of the original, 4:

$$y_1 = y_0(1 - d_1/d_0), \quad (4)$$

whereby, it should be noted that here $d_0$ itself is a negative numerical value (the zero point is on the optical flat plane of the original) so that the distance, $y_1$, from the optical axis is larger than the distance $y_0$, as can easily be seen in FIG. 1b. The angle, $\alpha_2$, in front of the light exit surface, that is in the light shaft, 31, can then be calculated as follows in conjunction with equation (1):

$$\alpha_2 = \alpha_1/n_2 + ((n_2-n_1)r_1 n_2)y_1 \quad (5)$$

In accordance with the equation (2), the distance of the light beam, 520, from the optical axis, O, at the light entry surface of the fight shaft, 31, which has a length of $d_2$, is as follows:

$$y_2 = y_1 - d_2\alpha_2 \quad (6)$$

Prior to entry into the light shaft, 31, that is between the light shaft, 31, and the field lens, 30, the angle, $\alpha_3$, is calculated as follows on the basis of equation (1):

$$\alpha_3 = \alpha_2(n_2/n_3) \quad (7)$$

because the light entry surface is level and, thereby, has a radius of $r_2 = $ infinity so that the remainder with $r_2$ in the denominator drops away (see equation (1)). At the exit surface of the field lens, 30, which is positioned at a distance, $d_3$, from the entry surface of the light shaft, 31, the distance, $y_3$, of the light beam, 520, from the optical axis, O, is calculated as follows:

$$y_3 = y_2 - d_3\alpha_3 \quad (8)$$

As a result, the angle, $\alpha_4$, of the light beam, 520, in the field lens, 30, whose exit surface has a radius of $r_3$, is calculated as follows:

$$\alpha_4 = \alpha_3(n_3/n_4) + y_3(1-(n_3/n_4))/r_3 \quad (9)$$

and the distance, $y_4$, of the light beam, 520, is calculated as follows at the entry surface of the field lens, 30:

$$y_4 = y_3 - d_4\alpha_4 \quad (10)$$

whereby $d_4$ represents the thickness of the field lens. In turn, this enables one to calculate the angle $\alpha_5$, of the light beam, 520, in front of the entry surface of the field lens, 30, with:

$$\alpha_5 = \alpha_4(n_4/n_5) + y_4(1-(n_4/n_5))/r_4 \quad (11)$$

whereby $d_4$ represents the radius of the entry surface of the field lens, 30.

Finally, the distance, $y_5$ of the light beam, 520, in front of the entry surface of the field lens, 30, is calculated as follows:

$$y_5 = y_4 - d_x\alpha_5 \quad (12)$$

whereby $d_x$ represents the distance of a point, x, from the entry surface of the field lens, 30. Because the beam amplitude, $y_5$, has to have the value 0 at the location at which the dyeing device, 2, must be positioned in the light beam path in order to achieve the aforementioned effect, the equation (12) has to be restructured in such a way that $d_x$ can be determined. This results in the following:

$$d_x = (y_4 - y_5)/\alpha_5 \quad (13)$$

from which the distance, $d_x$, from the entry surface of the field lens, 30, can be calculated and, thereby, one can determine the location at which the dyeing device, 2, has to be inserted in the light beam path. The configuration of the dyeing device, 2, itself is not the object of the invention and need not be described herein with greater detail. It can, therefore, be a conventional one, for example it can be designed as the one described in DE-A-32 26 408 the subject matter of which is hereby incorporated by reference in its entirety. However, other dyeing devices are also suitable.

When the exposure system is being operated, the intensity distribution is adjusted for one color (e.g., red) without an original at the image location, for example at the plane of the copying material onto which the original, 4, will be reproduced. The intensity distribution can be varied by the corresponding axial motion of the light source, 10, around the first focal point, F1, of the ellipsoid reflector, 11. The measurement of the intensity distribution can be made at the location of the image, for example, by photographic diodes or photographic diode arrays. A scattering element for simulating scattering object structures is then introduced into the light beam path at the location of the original, 4, after the measurement without an original, and the intensity is measured again at the location of the image. The ratio of the measured intensities, that is the ratio of "intensity at the image location with the scattering element at the location of the original" to the "intensity at the image location without scattering element at the location of the original" is in the range of about 0.6 to about 0.9, preferably in the range of 0.7 to 0.8.

Figure 4A:
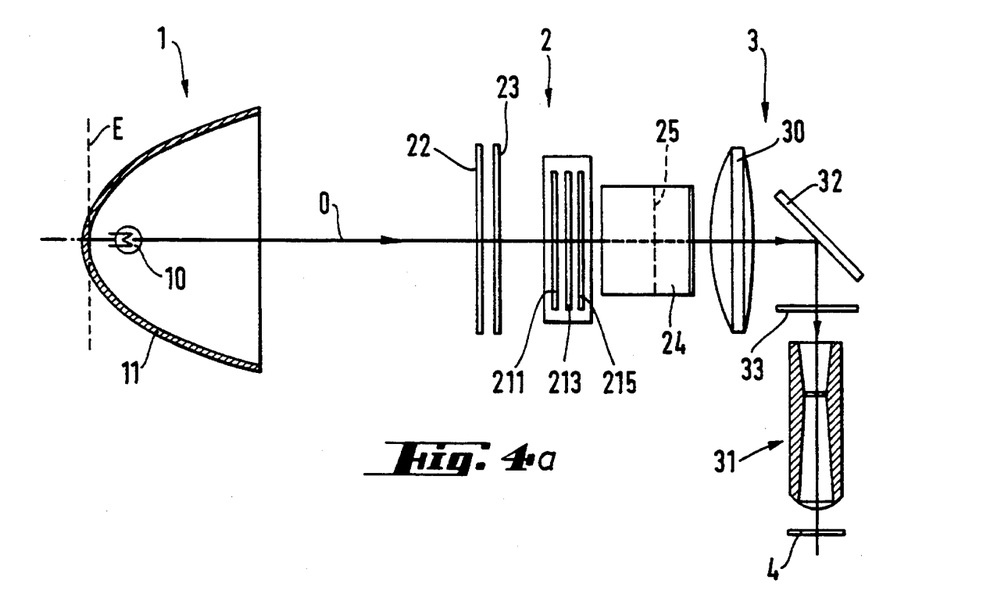
FIG. 4a shows another exemplary embodiment of an exposure system in accordance with the invention as a longitudinal cross section.
Figure 4B:
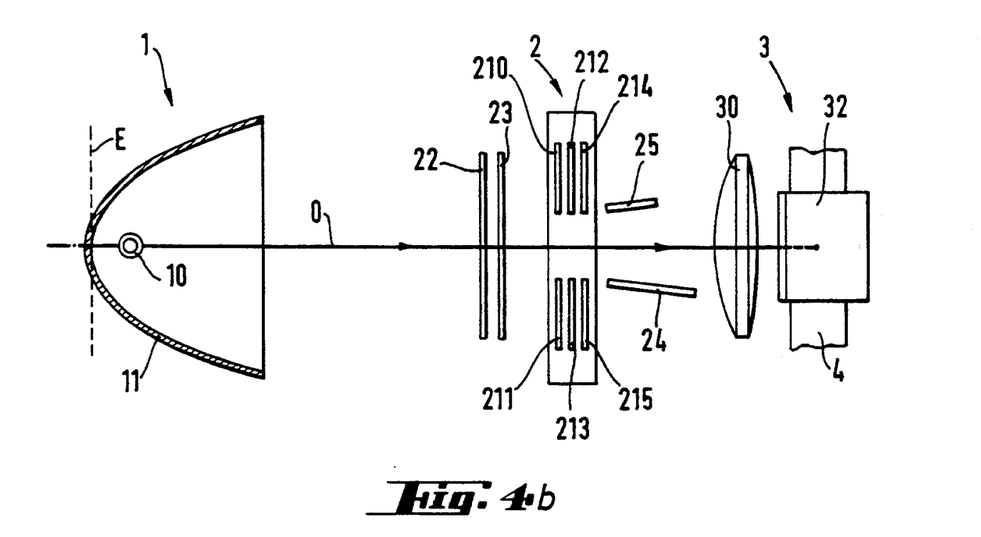

Another embodiment of an exposure system presented by the invention is depicted in FIGS. 4a and 4b. Similar to the embodiment shown in FIG. 1a, it includes a bulb housing, 1, with a light source, 10, and an ellipsoid reflector, 11, a dyeing device, 2, (of which several glass filters, 210, 211,212, 213, 214, and 215, are indicated), as well as an optical unit, 3, with a field lens, 30, and a light shaft, 31, which guides the light to the original, 4. This embodiment, however, also includes a heat protection filter, 22, a comb filter, 23, as well a two correction plates, 24 and 25. The optical unit, 3, also includes a light beam splitter, 32, which is located between the field lens, 30, and the light shaft, 31, and splits a portion of light off the beam (e.g., with a degree of transmission of about 5%) for measuring the light from the light beam path. This kind of measurement, for example, can be used for measuring the lightness of the entire cone of light and, thereby, for regulating the position of the glass filters by moving the glass filters of the dyeing device, 2, lower or higher in the cone of light as a function of the measurement results. Furthermore, the optical unit, 3, can also include a compensation filter, 33, which serves to subdue dominant spectral segments or spectral regions.

The purpose of the heat protection filter, 22, is readily evident from its name. The comb filter, 23, the purpose of which is not readily evident from its name (but rather, is used because of its transmission characteristics), is transparent only for light in the spectral ranges for which the copying material is sensitive, and it suppresses or heavily subdues the other spectral segments of the fight coming from the bulb housing.

The correction plates, 24 and 25, serve to support the homogenization or to produce a desired intensity distribution on the original. In particular, they correct asymmetrical color density distributions due to different dyeing of slanted light beams in the exposure beam path. As a result, inhomogeneities can be compensated by these correction plates, 24 and 25, by diverting portions of one half of the cone of light to the other half of the cone of light. For example, such correction plates can be in the form of one-sided, diffusing beam divider plates, whereby the scattering surface faces away (to the outside) from the cone of light.

With the kind of exposure system as described in the embodiments, one can avoid the reproduction of external shapes (shadows) as well as uneven transmission characteristics (density structures) of the glass filters, whereby it is also possible to change the exposure intensity (by moving the glass filters lower into the light beam path) without significant detriment to the homogeneity of the intensity distribution. Therefore, it is possible in this way to vary the intensity in an essentially homogeneous fashion if the glass filters are not placed at precisely the same depth or height in the light beam path or in the cone of light, for example because of mechanical reasons. In extreme cases, it is even possible to insert a glass filter in completely asymmetrical fashion into the cone of light and to vary the exposure intensity without distribution. Such exposure systems are particularly suitable for use in photographic printers or for use in fully automated photographic processors.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Exposure system for photographic copying machines with a bulb housing comprising:
   an ellipsoid reflector;
   a light source located along an optical axis near a first focal point of the ellipsoid reflector, said light source being moveable along the optical axis;
   an optical unit located in a light beam path in front of an optical flat plane of an original to be copied for producing a desired distribution of exposure intensity onto the original;
   imaging optics located in the light beam path behind the optical flat plane of the original for reproducing the original onto photographic copying material;
   a device for dyeing light used to illuminate the original located in the light beam path in front of the optical unit, such device including color filters which can be moved into and out of the light beam path on a plane that is perpendicular to the optical axis, the light source and the optical unit being positioned such that a light beam that penetrates a point on an edge of the original and intersects the optical axis at a location of an entry pupil of an imaging optics, also intersects the optical axis at a location of the device for dyeing.

2. Exposure system in accordance with claim 1, wherein the optical unit for producing a desired intensity distribution includes:
   a field lens positioned near a second focal point of the ellipsoid reflector;
   a light shaft for receiving light beams emanating from the field lens, said light shaft further including a diffusing plate which is set at a certain distance from the field lens so that the field lens images an optical flat plane that is perpendicular to the optical axis onto the diffusing plate, said optical flat plane having penetrating the apex of the ellipsoid reflector or being located between the apex and the first focal point of the ellipsoid reflector.

3. Exposure system in accordance with claim 1, further including:
   correction plates located between the device for dyeing the light and the optical unit for producing a desired intensity distribution and for supporting homogenization or for producing a desired intensity distribution on the original.

4. Exposure system in accordance with claim 1, further including:

a light beam splitter situated in front of the optical unit or the light shaft to split a portion of light off the light beam for a light measurement from the light beam path.

5. Exposure system in accordance with claim 1, further including:

a heat protection filter and a comb filter situated in front of the device for dyeing light, the comb filter being transparent only for light in spectral ranges to which the photographic copying material is sensitive.

* * * * *